United States Patent
Mizuno et al.

(10) Patent No.: US 12,359,099 B2
(45) Date of Patent: Jul. 15, 2025

(54) PRESSURE-SENSITIVE ADHESIVE COMPOSITION, PRESSURE-SENSITIVE ADHESIVE LAYER, AND PRESSURE-SENSITIVE ADHESIVE SHEET

(71) Applicant: NITTO DENKO CORPORATION, Ibaraki (JP)

(72) Inventors: Daisuke Mizuno, Ibaraki (JP); Kensuke Tani, Ibaraki (JP); Satoshi Honda, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 702 days.

(21) Appl. No.: 17/630,874

(22) PCT Filed: Jul. 29, 2020

(86) PCT No.: PCT/JP2020/029086
§ 371 (c)(1),
(2) Date: Jan. 27, 2022

(87) PCT Pub. No.: WO2021/020451
PCT Pub. Date: Feb. 4, 2021

(65) Prior Publication Data
US 2022/0315808 A1    Oct. 6, 2022

(30) Foreign Application Priority Data
Jul. 30, 2019    (JP) .................. 2019-140059

(51) Int. Cl.
C09J 7/38    (2018.01)
(52) U.S. Cl.
CPC .................... *C09J 7/385* (2018.01)

(58) Field of Classification Search
CPC .... C09J 7/385; C08F 220/302; C08F 230/065
See application file for complete search history.

(56) References Cited

U.S. PATENT DOCUMENTS

| | | | |
|---|---|---|---|
| 6,855,386 B1 * | 2/2005 | Daniels | C09J 133/08 427/372.2 |
| 2016/0228383 A1 | 8/2016 | Zhang et al. | |

(Continued)

FOREIGN PATENT DOCUMENTS

| | | |
|---|---|---|
| CN | 109073812 A | 12/2018 |
| JP | 2011-256362 A | 12/2011 |

(Continued)

OTHER PUBLICATIONS

Office Action issued on Feb. 11, 2023, for corresponding Chinese patent application No. 202080054570.2, along with an English translation (13 pages).

(Continued)

*Primary Examiner* — Fred M Teskin
(74) *Attorney, Agent, or Firm* — Hauptman Ham, LLP

(57) ABSTRACT

The present invention relates to a pressure-sensitive adhesive composition including a compound having a substituent represented by the general formula (1) described in the specification, in which when each of $R^1$ and $R^2$ in the substituent represented by the general formula (1) represents a hydrogen atom, a distance between an oxygen atom of —$OR^1$ and an oxygen atom of —$OR^2$ is 1.31 Å or more and 4.70 Å or less, a pressure-sensitive adhesive layer formed of the pressure-sensitive adhesive composition, and a pressure-sensitive adhesive sheet comprising the pressure-sensitive adhesive layer.

4 Claims, 2 Drawing Sheets

(56) References Cited

U.S. PATENT DOCUMENTS

| | | |
|---|---|---|
| 2016/0374954 A1 | 12/2016 | Zhang et al. |
| 2017/0240776 A1 | 8/2017 | Patnode et al. |
| 2017/0306197 A1 | 10/2017 | Shimokawa et al. |
| 2018/0052269 A1 | 2/2018 | Saito et al. |
| 2018/0118978 A1 | 5/2018 | Yabu et al. |
| 2019/0031920 A1 | 1/2019 | Saito et al. |
| 2019/0137675 A1 | 5/2019 | Kanno et al. |
| 2019/0293851 A1 | 9/2019 | Kanno et al. |
| 2020/0190362 A1 | 6/2020 | Yabu et al. |

FOREIGN PATENT DOCUMENTS

| | | |
|---|---|---|
| JP | 2012-233059 A | 11/2012 |
| JP | 2015-218178 A | 12/2015 |
| JP | 2017-514005 A | 6/2017 |
| JP | 2017-160313 A | 9/2017 |
| JP | 2017-194633 A | 10/2017 |
| JP | 2018-510926 A | 4/2018 |
| JP | 2019-14820 A | 1/2019 |
| WO | 2012/093607 A1 | 7/2012 |
| WO | 2016/143885 A1 | 9/2016 |
| WO | 2016/190400 A1 | 12/2016 |
| WO | WO 2019/199542 A1 * 10/2019 ............ C09J 133/24 |
| WO | 2019/221135 A1 | 11/2019 |

OTHER PUBLICATIONS

International Search Report issued for corresponding International Patent Application No. PCT/JP2020/029086 on Oct. 13, 2020, along with an English translation.

Written Opinion issued for corresponding International Patent Application No. PCT/JP2020/029086 on Oct. 13, 2020.

Payra et al., "Rational design of a biomimetic glue with tunable strength and ductility", Polymer Chemistry, 2017, 8, pp. 1654-1663, cited in the Specification.

Japanese Office Action issued on Jul. 2, 2024, in connection with the Japanese Patent Application No. 2021-535390 with its English translation, 10 pages.

* cited by examiner

PRESSURE-SENSITIVE ADHESIVE COMPOSITION, PRESSURE-SENSITIVE ADHESIVE LAYER, AND PRESSURE-SENSITIVE ADHESIVE SHEET

CROSS REFERENCE TO RELATED APPLICATION

This application is a National Stage of International Application No. PCT/JP2020/029086, filed on Jul. 29, 2020, which designates the United States and was published in Japan, and which is based upon and claims priority to Japanese Patent Application No. 2019-140059, filed on Jul. 30, 2019 in the Japan Patent Office. All of the aforementioned applications are hereby incorporated by reference in their entireties.

TECHNICAL FIELD

The present invention relates to a pressure-sensitive adhesive composition, a pressure-sensitive adhesive layer formed of the pressure-sensitive adhesive composition, and a pressure-sensitive adhesive sheet including the pressure-sensitive adhesive layer.

BACKGROUND ART

Commonly, an adhesive or a pressure-sensitive adhesive has been used for adhesion and fixation in various fields, and an adhesive that exhibits a sufficient adhesive force even for an adherend in a wet state in which adhesive force is difficult to be obtained has been developed.

For example, Patent Literature 1 describes a curable resin composition containing a boronic acid derivative whose structure is specific, which has good adhesion to a substrate and can form an adhesive layer having excellent water resistance even under a dew condensation environment or under a condition such as immersion in water.

Patent Literature 2 describes a pressure-sensitive adhesive comprising a polymerization product of a hydrophilic acidic comonomer and a non-reactive plasticizing agent which adheres quickly to wet or dry substrate surfaces, and a method of making the pressure-sensitive adhesive.

In addition, Patent Literature 3 describes a polymer that can be used as an underwater adhesive in which at least three types of side chains are bonded to a main chain of polyacrylates.

Non-Patent Literature 1 describes a copolymer of catechol and an acrylic monomer, which can be used as an underwater adhesive.

CITATION LIST

Patent Literature

Patent Literature 1: JP-A-2017-194633
Patent Literature 2: JP-A-2017-514005
Patent Literature 3: JP-A-2012-233059

Non-Patent Literature

Non-patent Literature 1: Polym. Chem., 2017, 8, 1654-1663

SUMMARY OF INVENTION

Technical Problem

In Patent Literature 1, a curable resin composition capable of forming an adhesive layer excellent in water resistance even under a dew condensation environment or under a condition such as immersion in water has been studied.

However, there is room for study on the adhesive force to an adherend in a wet state such as an adherend in water, and it is required to develop a pressure-sensitive adhesive layer exhibiting sufficient adhesive force to an adherend in a wet state.

Accordingly, an object of the present invention is to provide a pressure-sensitive adhesive composition that contains a compound having a specific substituent to exhibit a high adhesive force to an adherend in water or in a wet state, a pressure-sensitive adhesive layer formed of the pressure-sensitive adhesive composition, and a pressure-sensitive adhesive sheet including the pressure-sensitive adhesive layer.

Solution to Problem

The present inventors have studied intensively to provide a pressure-sensitive adhesive composition exhibiting a high adhesive force to an adherend in water or in a wet state, and as a result, the present inventors have come up with the idea of using a compound having a substituent capable of chemically bonding to an adherend as one component of a pressure-sensitive adhesive composition for forming a pressure-sensitive adhesive layer. As a result, the present inventors have found that, in order to obtain a pressure-sensitive adhesive layer that exhibits a high adhesive force to an adherend in a wet state and can be peeled off, it is important that the pressure-sensitive adhesive composition contains a compound having a substituent in which a distance between hydroxyl groups is set to a specific range, and the present inventors have completed the present invention. That is, the present invention is as follows.

[1] A pressure-sensitive adhesive composition, comprising a compound having a substituent represented by the following general formula (1), wherein, when each of $R^1$ and $R^2$ in the substituent represented by the general formula (1) represents a hydrogen atom, a distance between an oxygen atom of —$OR^1$ and an oxygen atom of —$OR^2$ is 1.31 Å or more and 4.70 Å or less

[Chem. 1]

(1)

(in the general formula (1), L represents an aryl group, a phosphorus atom, or a boron atom; and each of $R^1$ and $R^2$ independently represents a hydrogen atom, or an aliphatic hydrocarbon group, an aryl group or a heterocyclic group which may have a substituent.)

[2] The pressure-sensitive adhesive composition according to [1], wherein the compound is a polymer containing a structure derived from a compound A represented by the following general formula (2) or a compound B represented by the following general formula (3)

[Chem. 2]

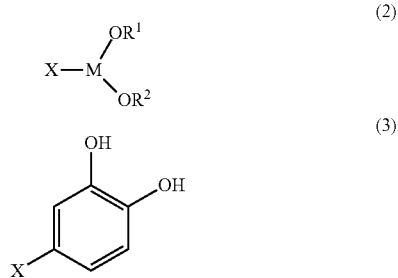

(in the general formulas (2) and (3), X represents a functional group containing a reactive group, and each of $R^1$ and $R^2$ independently represents a hydrogen atom, or an aliphatic hydrocarbon group, an aryl group or a heterocyclic group which may have a substituent; and M represents a phosphorus atom or a boron atom).

[3] The pressure-sensitive adhesive composition according to [1] or [2], wherein the compound is a polymer containing a structure derived from a (meth)acrylate monomer whose homopolymer has a glass transition temperature of 10° C. or lower.

[4] The pressure-sensitive adhesive composition according to [2] or [3], wherein the polymer is a copolymer of at least one (meth)acrylate monomer of 90 to 99 parts by mass and the compound A or the compound B of 1 to 10 parts by mass, and a glass transition temperature of the homopolymer of the (meth)acrylate monomer is 10° C. or lower.

[5] The pressure-sensitive adhesive composition according to any one of [2] to [4], wherein both $R^1$ and $R^2$ represent a hydrogen atom.

[6] The pressure-sensitive adhesive composition according to any one of [2] to [5], wherein X represents a functional group having at least one hydrogen donor group selected from the group consisting of an acrylic group, a methacrylic group, and an organic group having an active methylene group.

[7] A pressure-sensitive adhesive layer formed of the pressure-sensitive adhesive composition according to any one of [1] to [6].

[8] A pressure-sensitive adhesive sheet comprising the pressure-sensitive adhesive layer according to [7].

[9] The pressure-sensitive adhesive sheet according to [8], wherein the pressure-sensitive adhesive layer is formed on a substrate.

Advantageous Effects of Invention

According to the present invention, it is possible to provide a pressure-sensitive adhesive composition exhibiting a high adhesive force to an adherend in water or in a wet state, a pressure-sensitive adhesive layer formed of the pressure-sensitive adhesive composition, and a pressure-sensitive adhesive sheet including the pressure-sensitive adhesive layer.

DESCRIPTION OF EMBODIMENTS

Hereinafter, an embodiment of the present invention will be described in detail. The present invention is not limited to the embodiment to be described below.

A pressure-sensitive adhesive composition according to the embodiment of the present invention contains a compound having a substituent having —$OR^1$ and —$OR^2$ (each of $R^1$ and $R^2$ independently represents a hydrogen atom or an aliphatic hydrocarbon group, an aryl group or a heterocyclic group which may have a substituent), in which when each of $R^1$ and $R^2$ in the substituent having —$OR^1$ and —$OR^2$ represents a hydrogen atom, a distance between an oxygen atom of —$OR^1$ and an oxygen atom of —$OR^2$ (hereinafter, may be referred to as a "distance between O—O") is 1.31 Å or more and 4.70 Å or less.

A pressure-sensitive adhesive layer according to the embodiment of the present invention is formed of the pressure-sensitive adhesive composition according to the embodiment of the present invention.

A pressure-sensitive adhesive sheet according to the embodiment of the present invention preferably includes the pressure-sensitive adhesive layer according to the embodiment of the present invention, and the pressure-sensitive adhesive layer is preferably formed on a substrate.

Here, in the present specification, the term "pressure-sensitive adhesive sheet" may include those referred to as "pressure-sensitive adhesive tape", "pressure-sensitive adhesive label", "pressure-sensitive adhesive film", and the like.

The term "pressure-sensitive adhesive surface" refers to a surface (attachment surface) of the pressure-sensitive adhesive sheet on a side to be attached to an adherend. In the pressure-sensitive adhesive sheet of the present invention, only one surface may be a pressure-sensitive adhesive surface, or both surfaces may be pressure-sensitive adhesive surfaces.

In addition, the term "distance between O—O" means a calculated value of a distance between an oxygen atom of —$OR^1$ and an oxygen atom of —$OR^2$ in a substituent having —$OR^1$ and —$OR^2$, which is measured by Molecular Orbital PACkage (MOPAC) with a molecular modeling method. As a calculation program for MOPAC, WINMOSTAR (V9, 2, 3 for 64-bit Windows) has been used.

Figure 1:
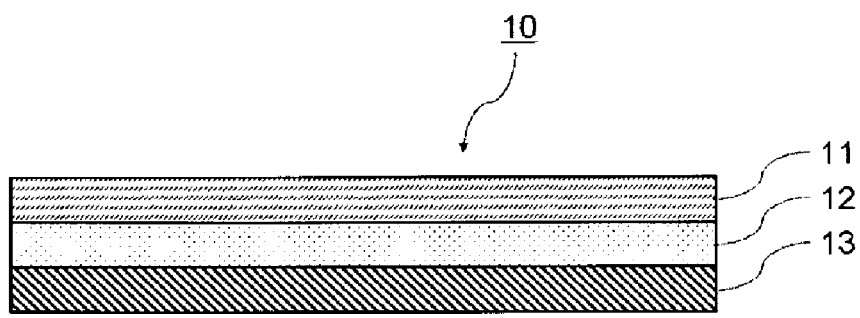
FIG. 1 is an example of a schematic cross-sectional view of a pressure-sensitive adhesive sheet according to an embodiment of the present invention.

FIG. 1 is an example of a schematic cross-sectional view of a pressure-sensitive adhesive sheet according to an embodiment of the present invention.

A pressure-sensitive adhesive sheet 10 of the present embodiment may include a substrate 11 and a pressure-sensitive adhesive layer 12, and a surface of the pressure-sensitive adhesive layer 12 on a side opposite to a side to which the substrate 11 is set may be releasably covered with a release liner 13.

The pressure-sensitive adhesive sheet 10 of the present embodiment is used by peeling and removing the release liner 13 and attaching the pressure-sensitive adhesive sheet 10 to an adherend via the pressure-sensitive adhesive layer 12. That is, a surface of the pressure-sensitive adhesive layer 12 on a side to which the release liner 13 is set is the pressure-sensitive adhesive surface in the present embodiment.

Figure 2:
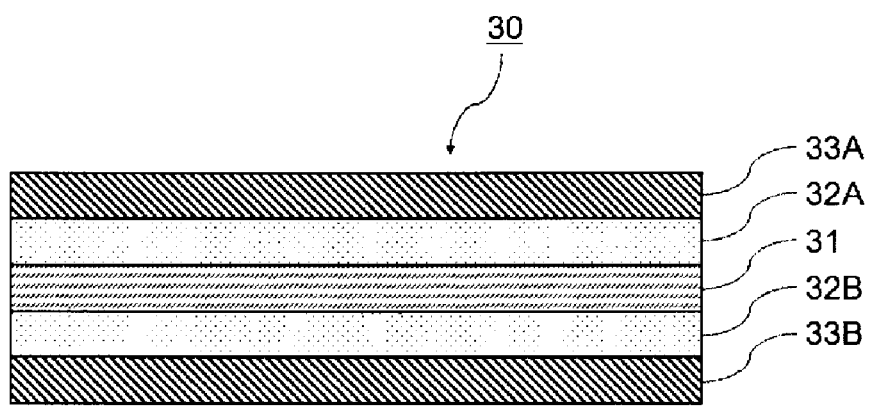
FIG. 2 is an example of a schematic cross-sectional view of a pressure-sensitive adhesive sheet according to an embodiment of the present invention.

As shown in FIG. 2, a pressure-sensitive adhesive sheet according to an embodiment of the present invention may include a pressure-sensitive adhesive layer on both sides of a substrate, and the pressure-sensitive adhesive layer may be protected by a release liner.

The pressure-sensitive adhesive sheet 30 of the present embodiment may include a first release liner 33A, a first pressure-sensitive adhesive layer 32A, a substrate 31, a second pressure-sensitive adhesive layer 32B, and a second release liner 33B in this order.

The pressure-sensitive adhesive sheet 30 of the present embodiment is used by peeling and removing the first release liner 33A and the second release liner 33B, and attaching the first pressure-sensitive adhesive layer 32A and the second pressure-sensitive adhesive layer 32B to different adherends. That is, in the present embodiment, both a surface of the first pressure-sensitive adhesive layer 32A on a side to which the first release liner 33A is set and a surface of the second pressure-sensitive adhesive layer 32B on a side to which the second release liner 33B is set are pressure-sensitive adhesive surfaces.

The substrate 31, the first and second pressure-sensitive adhesive layers 32A and 32B, and the first and second release liners 33A and 33B in the present embodiment are the same as the substrate 11, the pressure-sensitive adhesive layer 12, and the release liner 13 described above, respectively.

The pressure-sensitive adhesive sheet 30 in the present embodiment may be wound. That is, the pressure-sensitive adhesive sheet 30 of the present embodiment, for example, may not include the second release liner 33B, and may be wound such that the pressure-sensitive adhesive surface of the second pressure-sensitive adhesive layer 32B is attached to a surface of the first release liner 33A on a side opposite to a side to which the first pressure-sensitive adhesive layer 32A is set.

Figure 3:
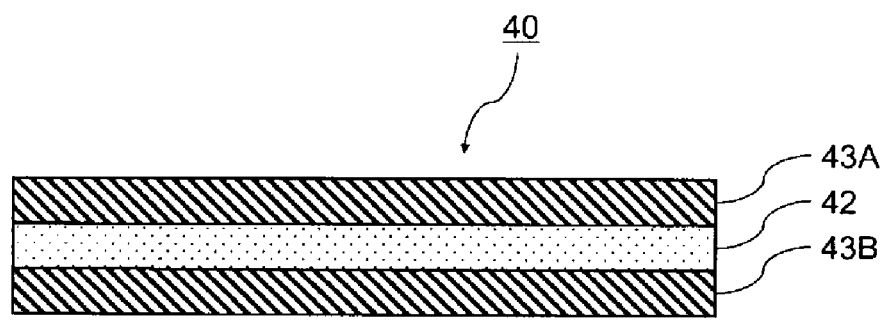
FIG. 3 is an example of a schematic cross-sectional view of a pressure-sensitive adhesive sheet according to an embodiment of the present invention.

As shown in FIG. 3, a pressure-sensitive adhesive sheet according to an embodiment of the present invention may not include a substrate, and both surfaces of the pressure-sensitive adhesive layer may be protected by release liners.

That is, a pressure-sensitive adhesive sheet 40 of the present embodiment may include a first release liner 43A, a pressure-sensitive adhesive layer 42, and a second release liner 43B in this order.

The pressure-sensitive adhesive sheet 40 of the present embodiment is used by peeling and removing the first release liner 43A and the second release liner 43B, and attaching one surface and the other surface of the pressure-sensitive adhesive layer 42 to different adherends. That is, in the present embodiment, both the surface of the pressure-sensitive adhesive layer 42 on a side to which the first release liner 43A is set and the surface of the pressure-sensitive adhesive layer 42 on a side to which the second release liner 43B is set are adhesive surfaces.

Hereinafter, a pressure-sensitive adhesive composition for forming the pressure-sensitive adhesive layer 12 of the present embodiment will be described in detail.

[Pressure-Sensitive Adhesive Composition]

The pressure-sensitive adhesive composition in the present embodiment contains a compound having a substituent represented by the general formula (1) (hereinafter, referred to as compound Z), in which when each of $R^1$ and $R^2$ in the substituent represented by the general formula (1) represents a hydrogen atom, a distance between an oxygen atom of —$OR^1$ and an oxygen atom of —$OR^2$ (hereinafter, may be referred to as a distance between O—O) is 1.31 Å or more and 4.70 Å or less.

[Chem. 3]

(1)

(In the general formula (1), L represents an aryl group, a phosphorus atom, or a boron atom; and each of $R^1$ and $R^2$ independently represents a hydrogen atom, or an aliphatic hydrocarbon group, an aryl group or a heterocyclic group which may have a substituent.)

When the distance between O—O in the substituent of the compound according to the present embodiment is 1.31 Å or more and 4.70 Å or less, a hydrogen bond with an adherend enables to exhibit an excellent adhesive force, and enables to exhibit a high adhesive force not only to a wet surface but also to an adherend in water.

The compound Z may be a monomer or a polymer, and in the case of a polymer, the compound Z is preferably a polymer having a structure derived from a monomer having a substituent having —$OR^1$ and —$OR^2$. Among them, a polymer having a substituent represented by the following general formula (1) in a side chain is more preferred.

[Chem. 4]

(1)

(In the general formula (1), L represents an aryl group, a phosphorus atom, or a boron atom; and each of $R^1$ and $R^2$ independently represents a hydrogen atom, or an aliphatic hydrocarbon group, an aryl group or a heterocyclic group which may have a substituent).

Examples of the aryl group represented by L include a phenyl group having 6 to 20 carbon atoms which may have a substituent, a naphthyl group having 10 to 20 carbon atoms which may have a substituent, and the like. Examples of the aliphatic hydrocarbon group represented by $R^1$ and $R^2$ include a linear or branched alkyl group having 1 to 20 carbon atoms which may have a substituent, a cyclic alkyl group having 3 to 20 carbon atoms which may have a substituent, an alkenyl group having 2 to 20 carbon atoms, and the like. Examples of the aryl group include a phenyl group having 6 to 20 carbon atoms which may have a substituent, a naphthyl group having 10 to 20 carbon atoms which may have a substituent, and the like. Examples of the heterocyclic group include a 5- or 6-membered ring group having at least one hetero atom which may have a substituent. These groups represented by $R^1$ and $R^2$ may be linked to each other to form a ring.

In the general formula (1), $R^1$ and $R^2$ preferably represent a hydrogen atom or a linear or branched alkyl group having 1 to 3 carbon atoms, and most preferably a hydrogen atom.

When $R^1$ and $R^2$ represent a hydrogen atom, the hydrogen bondability becomes strong, and strong adhesiveness is obtained.

For example, when an adherend contains an oxygen atom, the oxygen atom in the adherend is likely to form a hydrogen bond with —$OR^1$ and with —$OR^2$. When the pressure-sensitive adhesive composition contains a polymer having a substituent having —$OR^1$ and —$OR^2$, the hydrogen bond between the adherend and —OR$^1$ and —OR$^2$ enables to exhibit an excellent adhesive force and enables to exhibit a high adhesive force not only to a wet surface but also to an adherend in water.

When the pressure-sensitive adhesive sheet 10 of the present embodiment is attached to a wet surface of an adherend, a hydrogen bond between the surface of the adherend and —OR$^1$ and —OR$^2$, which are contained in a compound Z contained in the pressure-sensitive adhesive composition (pressure-sensitive adhesive layer 12) are generated. Therefore, the adhesive force to the adherend is enhanced, and as a result, a high adhesive force can be exhibited not only to a wet surface but also to an adherend in water. The compound Z is preferably capable of chemically bonding with an adherend, because the chemical bond between the adherend and the compound Z which is contained in the pressure-sensitive adhesive composition (pressure-sensitive adhesive layer 12) is promoted to generate, therefore the adhesive force to the adherend is further enhanced.

The compound Z is preferably a polymer containing a structure derived from a compound having two hydroxyl groups in the molecule from the viewpoint of hydrogen bondability with an adherend.

Specifically, the compound Z is preferably a polymer containing a structure derived from a compound A represented by the following general formula (2) or a compound B represented by the following general formula (3), and more preferably a polymer containing a structure derived from a compound A represented by the following general formula (2).

When the pressure-sensitive adhesive composition according to the embodiment of the present invention contains a structure derived from the compound A, a hydrogen bond with an adherend is strengthened, which is preferable.

[Chem. 5]

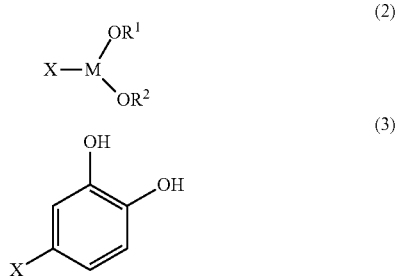

(In the above general formula, X represents a functional group containing a reactive group, and each of R$^1$ and R$^2$ independently represents a hydrogen atom, or an aliphatic hydrocarbon group, an aryl group or a heterocyclic group which may have a substituent. M represents a phosphorus atom or a boron atom.)

When M in the compound A represented by the general formula (2) represents boron, the distance between O—O is 2.26 Å, and when M in the compound A represented by the general formula (2) represents a phosphorus atom, the distance between O—O is 2.94 Å. The distance between O—O in the compound represented by the general formula (3) is 2.77 Å.

<Compound A>

The compound A is represented by the following general formula (2).

The compound A may be used as the compound Z, or may be used as a raw material monomer when the compound Z is a polymer containing a structure derived from the compound A.

[Chem. 6]

(In the above general formula (2), X represents a functional group containing a reactive group, and each of R$^1$ and R$^2$ independently represents a hydrogen atom, or an aliphatic hydrocarbon group, an aryl group or a heterocyclic group which may have a substituent. M represents a phosphorus atom or a boron atom.)

R$^1$ and R$^2$ in the general formula (2) have the same meanings as R$^1$ and R$^2$ in the general formula (1), and preferable examples thereof are also the same.

X of the compound A is a functional group (hereinafter, may be referred to as a functional group X) containing a reactive group, and is a functional group that can react with other curable components contained in the pressure-sensitive adhesive composition. Examples of the reactive group contained in the functional group X include a hydroxyl group, an amino group, an aldehyde group, a carboxyl group, a vinyl group, a (meth)acrylic group, a styryl group, a (meth)acrylamide group, an organic group having an ether bond (for example, a vinyl ether group, an epoxy group, or an oxetane group), a mercapto group, an amino group, an active methylene group, and a benzyl group.

The reactive group contained in the functional group X may be a hydrogen donor group. The hydrogen donor group is a functional group having a structure that can generate a free radical by withdrawing a hydrogen atom in a molecule through the action of a polymerization initiator or the like having an ability of withdrawing hydrogen. Specific examples of the hydrogen donor group include a mercapto group, an amino group, an active methylene group, a benzyl group, a hydroxyl group, and an organic group having an ether bond.

The reactive group contained in the functional group X is preferably a functional group containing at least one reactive group selected from the group consisting of an acryloyl group, a methacrylic group, and an active methylene group.

When the compound Z used for the pressure-sensitive adhesive composition is active energy ray-curable, the reactive group contained in the functional group X is preferably at least one reactive group selected from the group consisting of a vinyl group, a (meth)acrylic group, a styryl group, a (meth)acrylamide group, a vinyl ether group, an epoxy group, an oxetane group, and a mercapto group. When the compound Z is particularly radical polymerizable, the reactive group contained in X is preferably at least one reactive group selected from the group consisting of a (meth)acrylic group, a styryl group, and a (meth)acrylamide group. The (meth)acrylamide group is more preferred since the compound A having the (meth)acrylamide group has a high reactivity and a high copolymerization rate with a resin composition which is active energy ray-curable. In addition, the (meth)acrylamide group is also preferred from the viewpoint that the effect of the present invention can be efficiently obtained since the (meth)acrylamide group has high polarity and excellent adhesiveness.

When the compound Z used for the pressure-sensitive adhesive composition is cationic polymerizable, a reactive group contained in the functional group X is preferably at least one functional group selected from a hydroxyl group, an amino group, an aldehyde group, a carboxyl group, a vinyl ether group, an epoxy group, an oxetane group, and a mercapto group. The epoxy group is preferred since adhesibility between an obtained pressure-sensitive adhesive layer and an adherend is excellent particularly when the epoxy group is contained. The vinyl ether group is preferred since the curability of the pressure-sensitive adhesive composition is excellent when the vinyl ether group is contained.

The reactive group contained in the functional group X is preferably linked to a phosphorus atom or a boron atom represented by M via a linking group.

Examples of the linking group include a phenylene group, an alkylene group, a tolylene group, a naphthylene group and a bisphenylene group, and a phenylene group or an alkylene group is preferred.

M in the general formula (2) preferably represents a boron atom.

Examples of the alkylene group include linear or branched alkylene groups having 1 to 10 (preferably 2 to 6) carbon atoms, such as an ethylene group, a propylene group, a trimethylene group, a tetramethylene group, a pentamethylene group, and a hexamethylene group.

The compound A represented by the general formula (2) is preferably represented by the following general formula (2-1).

[Chem. 7]

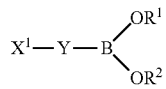

(2-1)

(In the above general formula, Y represents a phenylene group or an alkylene group, $X^1$ represents a reactive group, and $R^1$ and $R^2$ are the same as defined above.)

Examples of the alkylene group represented by Y include linear or branched alkylene groups having 1 to 10 (preferably 2 to 6) carbon atoms, such as an ethylene group, a propylene group, a trimethylene group, a tetramethylene group, a pentamethylene group, and a hexamethylene group.

Examples of the reactive group represented by $X^1$ include the same reactive groups as those contained in X described above, and preferred examples thereof are also the same.

More preferred examples of the compound A include the following compounds (1a) to (1d).

[Chem. 8]

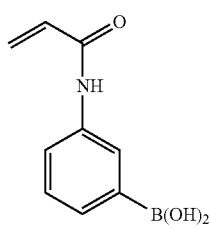

(1a)

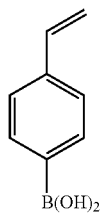

(1b)

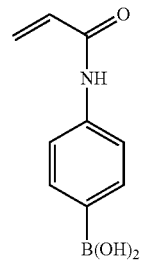

(1c)

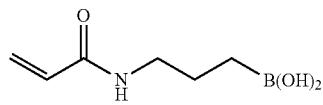

(1d)

In the present invention, the compound A may be a compound in which a reactive group and a boron atom are directly bonded to each other, and as shown in the specific examples, the compound A is preferably a compound in which a reactive group and a boron atom are bonded to each other via a linking group such as a phenylene group or an alkylene group, that is, a compound represented by the general formula (2-1). The compound represented by the general formula (2-1) is preferred since adhesion water resistance is improved in a case (in the case of the general formula (2-1)) where the compound A does not have a boron-oxygen bond but has a boron-carbon bond which is derived from a boron atom-phenylene group bond or a boron atom-alkylene group bond and contains a reactive group.

It is further preferred in the present invention that the compound A is a compound in which a reactive group and a boron atom are bonded via an organic group having 1 to 20 carbon atoms which may have a substituent, since adhesion water resistance of a pressure-sensitive adhesive layer obtained after curing is improved. Examples of the organic group having 1 to 20 carbon atoms which may have a substituent include a linear or branched alkylene group having 1 to 20 carbon atoms which may have a substituent, a cyclic alkylene group having 3 to 20 carbon atoms which may have a substituent, a phenylene group having 6 to 20 carbon atoms which may have a substituent, and a naphthylene group having 10 to 20 carbon atoms which may have a substituent.

Examples of the compound A include esters of (meth)acrylate and boric acid, such as esters of hydroxyethylacrylamide and boric acid, esters of methylolacrylamide and boric acid, esters of hydroxyethylacrylate and boric acid, and esters of hydroxybutylacrylate and boric acid, in addition to the compounds exemplified above.

<Compound B>

The compound B is preferably represented by the following general formula (3).

The compound B may be used as the compound Z, or may be used as a raw material monomer when the compound Z is a polymer containing a structure derived from the compound B.

[Chem. 9]

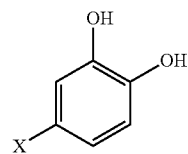

(3)

(In the above general formula, X represents a functional group containing a reactive group.)

X in the general formula (3) has the same meaning as X in the general formula (2), and preferable examples thereof are also the same.

The compound B represented by the general formula (3) is preferably represented by the following general formula (3-1).

[Chem. 10]

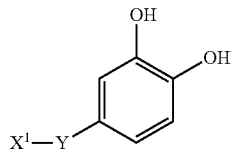

(3-1)

(In the above general formula, Y represents a phenylene group or an alkylene group, and $X^1$ represents a reactive group.)

$X^1$ and Y in the general formula (3-1) have the same meanings as $X^1$ and Y in the general formula (2-1), and preferable examples thereof are also the same.

In the pressure-sensitive adhesive composition, the content of the compound Z is more than 0 mass %, and from the viewpoint of elastic modulus, the content is preferably 1 mass % or more, and more preferably 3 mass % or more. In addition, the content is preferably 35 mass % or less, more preferably 33 mass % or less, and still more preferably 30 mass % or less.

When the compound A is used as the compound Z, the content of the compound A in the pressure-sensitive adhesive composition is preferably 1 mass % or more, and more preferably 3 mass % or more, from the viewpoint of the elastic modulus. In addition, the content is preferably 10 mass % or less, and more preferably 5 mass % or less.

When the compound B is used as the compound Z, the content of the compound (B) in the pressure-sensitive adhesive composition is preferably 1 mass % or more, and more preferably 3 mass % or more, from the viewpoint of the elastic modulus. In addition, the content is preferably 10 mass % or less, and more preferably 5 mass % or less.

(Base Polymer)

In the pressure-sensitive adhesive composition according to the present embodiment, a known polymer used for a pressure-sensitive adhesive can be used as a base polymer. Here, the base polymer refers to a main component of a polymer contained in the pressure-sensitive adhesive composition. In this specification, the term "main component" refers to a component contained in an amount of more than 50 mass %, unless otherwise specified.

The base polymer may be a polymer containing a structure derived from the compound Z, and is more preferably a copolymer of a monomer component constituting a known polymer and a monomer having a substituent represented by the general formula (1), that is, the compound Z as a monomer. In addition, a mixture of a polymer containing a structure derived from the compound Z and a known polymer may be used as the base polymer.

The base polymer contained in the pressure-sensitive adhesive composition in the present embodiment is not particularly limited, and examples thereof include an acrylic polymer, a rubber-based polymer, a vinyl alkyl ether-based polymer, a silicone-based polymer, a polyester-based polymer, a polyamide-based polymer, a urethane-based polymer, a fluorine-based polymer, and an epoxy-based polymer. Among the polymers exemplified above, an acrylic polymer and a rubber-based polymer are preferred from the viewpoint of adhesion, and an acrylic polymer is more preferred from the viewpoint of pressure-sensitive adhesion.

The acrylic polymer is a polymer containing (meth)acrylates as a main monomer component, and a polymer containing an alkyl (meth)acrylate (an alkyl (meth)acrylate having a linear or branched alkyl group) as a main monomer component can be suitably used. Examples of the alkyl (meth)acrylate include alkyl (meth)acrylates having an alkyl group having 1 to 20 carbon atoms, such as methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, and eicosyl (meth)acrylate. Among them, alkyl (meth)acrylates having an alkyl group having 1 to 14 carbon atoms are preferred, and alkyl (meth)acrylates having an alkyl group having 2 to 10 carbon atoms are more preferred. The term "(meth)acrylate" refers to an "acrylate" and/or a "methacrylate", and the same applies to the others.

Examples of the (meth)acrylates other than the alkyl (meth)acrylates include (meth)acrylates having an alicyclic hydrocarbon group, such as cyclopentyl (meth)acrylate, cyclohexyl (meth)acrylate, and isobornyl (meth)acrylate, and (meth)acrylates having an aromatic hydrocarbon group, such as phenyl (meth)acrylate.

These (meth)acrylates can be used alone or in combination of two or more kinds thereof. A monomer other than the acrylic monomer may be copolymerized with the (meth)acrylates.

In the present embodiment, a content of the alkyl (meth)acrylates in the monomer components constituting the acrylic polymer is 80 mass % or more, more preferably 90 mass % or more, and still more preferably 95 mass % or more.

Among the above monomer components, a (meth)acrylate monomer whose homopolymer has a glass transition temperature (Tg) of 10° C. or lower is preferred from the viewpoint of the elastic modulus. The above monomer components are preferably a (meth)acrylate monomer that forms a homopolymer having a Tg of more preferably −20° C. or lower, still more preferably −50° C. or lower.

When the glass transition temperature (Tg) of the homopolymer is 10° C. or lower, the elastic modulus decreases, and an effect of good followability can be obtained even for an adherend having an uneven surface.

Here, the "glass transition temperature (Tg) of a homopolymer" means the "glass transition temperature (Tg) of a homopolymer of a monomer", and means the glass transition temperature (Tg) of a polymer formed by using only a certain monomer as a monomer component.

Preferably, the polymer (base polymer) contained in the pressure-sensitive adhesive composition according to the present embodiment is a copolymer of at least one (meth) acrylate monomer in an amount of 90 to 99 parts by mass and the compound A or the compound B in an amount of 1 to 10 parts by mass, and the homopolymer of the (meth) acrylate monomer has a Tg of 10° C. or lower.

In addition to the base polymer, a polymer such as a modifier (hereinafter, also referred to as another polymer) may be contained as long as the effects of the present invention are not significantly impaired. In this case, the content of the other polymer relative to the whole base polymer (100 parts by mass) is preferably 75 parts by mass or less, and more preferably 60 parts by mass or less.

The content of the base polymer in the pressure-sensitive adhesive composition according to the present embodiment is not particularly limited, but from the viewpoint of initial adhesive force, the content is preferably 5 mass % or more, more preferably 10 mass % or more, and still more preferably 20 mass % or more relative to the whole components of the pressure-sensitive adhesive composition excluding the solvent, that is, the total amount of the components of the pressure-sensitive adhesive composition excluding the solvent. The content of the base polymer is preferably 90 mass % or less, more preferably 80 mass % or less, still more preferably 70 mass % or less, relative to the whole components of the pressure-sensitive adhesive composition excluding the solvent.

The method for obtaining the acrylic polymer is not particularly limited, and various polymerization methods known as a synthesis method of the acrylic polymer, such as a solution polymerization method, an emulsion polymerization method, a bulk polymerization method, a suspension polymerization method, and a photopolymerization method, can be appropriately adopted. In some embodiments, a solution polymerization method can be preferably adopted. The polymerization temperature during solution polymerization can be appropriately selected according to the types of monomers and solvents used, the type of polymerization initiators, and the like, and can be, for example, about 20° C. to 170° C. (typically about 40° C. to 140° C.).

The initiator used for the polymerization can be appropriately selected from commonly known thermal polymerization initiators, photopolymerization initiators, and the like according to the polymerization method. The polymerization initiator may be used alone or in combination of two or more thereof.

Examples of the thermal polymerization initiator include azo-based polymerization initiators (such as 2,2'-azobisisobutyronitrile, 2,2'-azobis-2-methylbutyronitrile, dimethyl 2,2'-azobis(2-methylpropionate), 4,4'-azobis-4-cyanovaleric acid, azobisisovaleronitrile, 2,2'-azobis(2-amidinopropane) dihydrochloride, 2,2'-azobis[2-(5-methyl-2-imidazolin-2-yl) propane] dihydrochloride, 2,2'-azobis(2-methylpropionamidine) disulfate, and 2,2'-azobis(N,N'-dimethyleneisobutylamidine) dihydrochloride); persulfates such as potassium persulfate; peroxide-based polymerization initiators (such as dibenzoyl peroxide, t-butyl permaleate, and lauroyl peroxide); and redox-based polymerization initiators. The amount of the thermal polymerization initiator used is not particularly limited, and may be, for example, within the range of 0.01 parts by mass to 5 parts by mass, and preferably 0.05 parts by mass to 3 parts by mass, relative to 100 parts by mass of the monomer component used for the preparation of the acrylic polymer.

The photopolymerization initiator is not particularly limited, and examples thereof include a benzoin ether-based photopolymerization initiator, an acetophenone-based photopolymerization initiator, an α-ketol-based photopolymerization initiator, an aromatic sulfonyl chloride-based photopolymerization initiator, a photoactive oxime-based photopolymerization initiator, a benzoin-based photopolymerization initiator, a benzyl-based photopolymerization initiator, a benzophenone-based photopolymerization initiator, a ketal-based photopolymerization initiator, a thioxanthone-based photopolymerization initiator, and an acylphosphine oxide-based photopolymerization initiator. The amount of the photopolymerization initiator used is not particularly limited, and may be, for example, within the range of 0.01 parts by mass to 5 parts by mass, and preferably 0.05 parts by mass to 3 parts by mass, relative to 100 parts by mass of the monomer component used for the preparation of the acrylic polymer.

In some embodiments, the acrylic polymer can be contained in the pressure-sensitive adhesive composition for forming a pressure-sensitive adhesive layer in the form of a partially polymerized product (acrylic polymer syrup) obtained by polymerizing a part of the monomer components by means of irradiating a mixture of the monomer components described above and a polymerization initiator with ultraviolet rays (UV). The polymerization can be completed by applying a pressure-sensitive adhesive composition containing such an acrylic polymer syrup to a predetermined object to be coated, and then irradiating the predetermined object with ultraviolet rays. That is, the acrylic polymer syrup can be understood as a precursor of an acrylic polymer.

The pressure-sensitive adhesive composition according to the present embodiment may contain a tackifier for the purpose of adjusting the elastic modulus and imparting tack at the time of initial adhesion. Examples of the tackifier include polybutenes, rosin-based resins, terpene-based resins, petroleum-based resins (for example, petroleum-based aliphatic hydrocarbon resins, petroleum-based aromatic hydrocarbon resins, petroleum-based aliphatic/aromatic copolymerized hydrocarbon resins, petroleum-based alicyclic hydrocarbon resins (hydrogenated aromatic hydrocarbon resins)), and coumarone-based resins. From the viewpoint of compatibility with the base polymer, the petroleum-based resins or the rosin-based resins are preferred. The tackifiers may be used alone or in combination of two or more kinds thereof.

When a tackifier is contained in the pressure-sensitive adhesive composition, the content thereof is preferably 10 parts by mass or more, more preferably 30 parts by mass or more, and still more preferably 50 parts by mass or more, relative to 100 parts by mass of the base polymer, from the viewpoint of reducing the elastic modulus. The content of the tackifier is preferably 500 parts by mass or less, more preferably 400 parts by mass or less, and still more preferably 250 parts by mass or less, relative to 100 parts by mass of the base polymer, from the viewpoint of imparting an appropriate cohesive force to the pressure-sensitive adhesive.

The pressure-sensitive adhesive composition of the present embodiment may further contain additives generally added to the pressure-sensitive adhesive composition, such as a viscosity modifier, a release modifier, a plasticizer, a softener, a filler, a colorant (a pigment, a dye, or the like), an anti-aging agent, a surfactant, a leveling agent, an antifoaming agent, and a light stabilizer, as long as the effects of the present invention are not impaired.

Examples of the filler include inorganic fillers such as talc, titanium oxide, calcium oxide, magnesium oxide, zinc oxide, titanium oxide, calcium carbonate, carbon, silica, clay, mica, barium sulfate, whisker, and magnesium hydroxide.

The content of the filler is preferably 500 parts by mass or less, more preferably 300 parts by mass or less, relative to 100 parts by mass of the base polymer, from the viewpoint of rough surface adhesion.

As the solvent used for the pressure-sensitive adhesive composition, various general solvents can be used. Examples of the solvent include organic solvents, for example, esters such as ethyl acetate and n-butyl acetate; aromatic hydrocarbons such as toluene and benzene; aliphatic hydrocarbons such as n-hexane and n-heptane; alicyclic hydrocarbons such as cyclohexane and methylcyclohexane; and ketones such as methyl ethyl ketone and methyl isobutyl ketone. The solvent may be used alone or in combination of two or more kinds thereof.

As for the pressure-sensitive adhesive composition according to the present embodiment, when the pressure-sensitive adhesive layer is formed, the Young's modulus of the pressure-sensitive adhesive layer at 25° C. is preferably 0.1 kPa or more, more preferably 1 kPa or more, still more preferably 5 kPa or more, and particularly preferably 10 kPa or more. When the Young's modulus is 0.1 kPa or more, deformation of the pressure-sensitive adhesive layer is less likely to occur, and the shape stability of the pressure-sensitive adhesive sheet is good. In addition, problems such as adhesive extrusion are less likely to occur due to stress applied after adhesion.

From the viewpoint of adhesion to the wet surface, the Young's modulus is preferably 400 kPa or less, more preferably 200 kPa or less, and still more preferably 100 kPa or less. When the Young's modulus is 400 kPa or less, it can well follow the rough surface with unevenness of a wet adherend. In addition, even when used in water, good adhesive force and excellent water resistance can be exhibited.

Here, the Young's modulus of the pressure-sensitive adhesive layer when the pressure-sensitive adhesive layer is formed can be calculated from a stress-strain curve measured when a sample in which the pressure-sensitive adhesive layer is formed in a string shape is prepared and pulled at a rate of 50 mm/min using a tensile tester (AG-IS manufactured by Shimadzu Corporation).

[Pressure-Sensitive Adhesive Layer]

The pressure-sensitive adhesive layer of the present embodiment is formed using the above pressure-sensitive adhesive composition. The formation method is not particularly limited, and a known method can be employed. The formation can be performed in accordance with the following method for producing a pressure-sensitive adhesive sheet. The preferred range of the amount of components in the pressure-sensitive adhesive layer is the same as the preferred range of the amount of components excluding the solvent in the pressure-sensitive adhesive composition.

The pressure-sensitive adhesive layer in the present embodiment is formed using the above-described pressure-sensitive adhesive composition. The formation method is not particularly limited, and a known method can be adopted. For example, the pressure-sensitive adhesive composition is applied to a substrate to be described later using a known coating method and is dried, so that a pressure-sensitive adhesive layer can be obtained in the form of a pressure-sensitive adhesive sheet. Alternatively, the pressure-sensitive adhesive composition may be applied to a releasable surface and dried or cured to form a pressure-sensitive adhesive layer on the surface, and then the pressure-sensitive adhesive layer may be bonded to a non-releasable substrate and transferred thereto. The method for applying the pressure-sensitive adhesive composition to the substrate is not particularly limited, and the pressure-sensitive adhesive composition can be applied using, for example, a gravure roll coater, a reverse roll coater, a kiss roll coater, a dip roll coater, a bar coater, a knife coater, a spray coater, a fountain die coater, a closed edge die coater, or the like.

The drying temperature may be, for example, 50° C. to 150° C.

In addition, as for the pressure-sensitive adhesive layer, the pressure-sensitive adhesive composition may be applied to a release liner (may be a sheet-shaped substrate having a release surface) to form a pressure-sensitive adhesive layer.

The thickness of the pressure-sensitive adhesive layer after drying is not particularly limited, and is preferably 5 to 5000 μm, and more preferably 10 to 1000 m from the viewpoint of exhibiting good followability to an adherend having an uneven surface.

The pressure-sensitive adhesive layer may be formed by a solvent-free coating method such as rolling or extrusion. In this case, the pressure-sensitive adhesive composition can be obtained as a kneaded product by performing heating and kneading. For the kneading, for example, a batch type kneader such as a kneader, a Banbury mixer, and a mixing roll, or a continuous kneader such as a biaxial kneader is used. The heating temperature in the kneading may be, for example, 80° C. to 180° C.

The pressure-sensitive adhesive composition obtained as described above can be heated by a molding apparatus such as an extruder, a calender roll, or a press machine (heat press machine) to form the pressure-sensitive adhesive layer 12 into a sheet shape.

The pressure-sensitive adhesive sheet of the present embodiment includes the above pressure-sensitive adhesive layer.

The concept of the pressure-sensitive adhesive sheet referred to herein may include those referred to as a pressure-sensitive adhesive tape, a pressure-sensitive adhesive label, a pressure-sensitive adhesive film, and the like.

The pressure-sensitive adhesive sheet of the present embodiment may be a substrate-supported pressure-sensitive adhesive sheet including the pressure-sensitive adhesive layer on one surface or both surfaces of a sheet-shaped substrate (support), or may be a substrate-less pressure-sensitive adhesive sheet including the pressure-sensitive adhesive layer held on a release liner.

The pressure-sensitive adhesive sheet of the present embodiment may include another pressure-sensitive adhesive layer having a composition different from that of the above pressure-sensitive adhesive layer.

The pressure-sensitive adhesive sheet of the present embodiment may be a substrate-supported pressure-sensitive adhesive sheet including another pressure-sensitive adhesive layer on one surface or both surfaces of a sheet-shaped substrate (support), in which the pressure-sensitive adhesive layer (wet pressure-sensitive adhesive layer) according to the embodiment of the present invention is provided on the other pressure-sensitive adhesive layer.

In addition, the pressure-sensitive adhesive sheet may be a substrate-supported pressure-sensitive adhesive sheet including other pressure-sensitive adhesive layers on both surfaces of a sheet-shaped substrate (support), in which a wet pressure-sensitive adhesive layer is provided on one of the other pressure-sensitive adhesive layers.

The pressure-sensitive adhesive sheet may be a substrate-less pressure-sensitive adhesive sheet including a wet pressure-sensitive adhesive layer on one surface or both surfaces of another pressure-sensitive adhesive layer.

(Substrate)

Examples of the material for forming the substrate include polyolefin-based films such as polyethylene, polypropylene, and ethylene-propylene copolymers; polyester-based films such as polyethylene terephthalate; plastic films such as polyvinyl chloride; paper such as kraft paper and Japanese paper; fabrics such as cotton cloth and staple cloth; nonwoven fabrics such as a polyester nonwoven fabric and a vinylon nonwoven fabric; and metal foils. The thickness of the substrate is not particularly limited.

The plastic films may be unstretched films or stretched (uniaxially stretched or biaxially stretched) films. The surface of the substrate on which the pressure-sensitive adhesive layer is to be provided may be subjected to a surface treatment such as coating of an undercoat agent or a corona discharging treatment.

In the present embodiment, the pressure-sensitive adhesive sheet may be perforated to provide a through hole. In this case, when the pressure-sensitive adhesive sheet is attached to the adherend, moisture on the wet surface of the adherend can be released to the back surface side of the pressure-sensitive adhesive sheet (the side opposite to the attachment surface) through the through hole, so that more moisture on the wet surface of the adherend can be removed.

(Release Liner)

In the pressure-sensitive adhesive sheet of the present embodiment, the pressure-sensitive adhesive layer and the other pressure-sensitive adhesive layer according to the embodiment of the present invention may be protected by a release liner (separator, release film) until they are used.

As the release liner, a common release paper or the like can be used and is not particularly limited, and for example, a substrate including a release treatment layer, a low adhesive substrate formed of a fluorine-based polymer, and a low adhesive substrate formed of a nonpolar polymer can be used.

Examples of the substrate including a release treatment layer include a plastic film or paper surface-treated with a release treatment agent such as a silicone-based release treatment agent, a long-chain alkyl-based release treatment agent, a fluorine-based release treatment agent, and molybdenum sulfide.

Examples of the fluorine-based polymer of the low adhesive substrate formed of a fluorine-based polymer include polytetrafluoroethylene, polychlorotrifluoroethylene, polyvinyl fluoride, polyvinylidene fluoride, a tetrafluoroethylene-hexafluoropropylene copolymer, and a chlorofluoroethylene-vinylidene fluoride copolymer.

Examples of the nonpolar polymer of the low adhesive substrate formed of a nonpolar polymer include olefin-based resins (for example, polyethylene, and polypropylene). The release liner can be formed by a known or common method. The thickness and the like of the release liner are also not particularly limited.

(Adherend)

An adherend to which the pressure-sensitive adhesive sheet of the present embodiment is attached is not particularly limited, and is preferably an adherend capable of forming a hydrogen bond with the structure derived from the compound Z in the pressure-sensitive adhesive composition (pressure-sensitive adhesive layer).

Examples of the adherend include concrete, mortar, asphalt, metals (for example, SUS plates, and Al plates), wood, tiles, plastic materials (for example, acrylic plates, and baked plates), building exterior materials and interior materials such as a coated film surface and an inner wall of a bathroom, underwater and water surface structures such as ships and buoys, water tanks, bathtubs, sports tools, fabrics such as woven fabrics and nonwoven fabrics, and porous bodies such as paper, electrolyte membranes, separation membranes, and filters. In addition, the adherend may be a living organism, and may be an outside of the living organism (for example, a skin, an outer shell, and a scale), or an inside of the living organism (for example, a tooth, and a bone).

EXAMPLES

Hereinafter, the present invention will be specifically described with reference to Examples, but the present invention is not limited to these Examples.

<Adhesion>

The prepared pressure-sensitive adhesive sheet (test piece) of each example was pressure-attached to a surface of a test plate (glass plate) in water by being reciprocated once with a roller of 2 kg.

After the attachment, aging was performed in water for 30 minutes. After the aging, the pressure-sensitive adhesive sheet was peeled from the test plate using a tensile tester (device name: "Autograph AGS-X", manufactured by Shimadzu Corporation) under conditions of a tensile rate of 300 mm/min and a peeling angle of 180° in an atmosphere of 23° C. and 50% RH in accordance with JIS Z0237, and a 180° peeling adhesive force (N/20 mm) was measured.

As a test plate, a glass plate (trade name "soda lime glass #0050", manufactured by Matsunami Glass Ind., Ltd.) was used.

Example 1

To a three-necked flask equipped with a stirring blade, a thermometer, a nitrogen gas inlet tube, and a cooler, 95 parts by mass of butyl acrylate (BA) (manufactured by Toagosei Co., Ltd.), 5 parts by mass of 3-acrylamide benzeneboronic acid (AAPBA) (manufactured by Junsei Chemical Co., Ltd.), 0.2 parts by mass of 2,2'-azobisisobutyronitrile (AIBN) as a thermal polymerization initiator, and 250 parts by mass of methyl ethyl ketone (MEK) (manufactured by Fujifilm Wako Pure Chemical Industries, Ltd.) were added.

After performing stirring at 63° C. in a nitrogen atmosphere for 1 hour, 0.2 parts of AIBN was added thereto as a thermal polymerization initiator, and the mixture was allowed to react at 63° C. for 7 hours.

The distance between O—O of AAPBA is 2.26 Å.

The glass transition temperature of the homopolymer of butyl acrylate is −55° C.

The solution after the reaction was directly applied to a PET release liner (MRF38 (manufactured by Mitsubishi Chemical Corporation)) as a substrate, followed by drying in an oven at 120° C. for 5 minutes, and coated with a PET release liner (MRE38 (manufactured by Mitsubishi Chemical Corporation)) to prepare a pressure-sensitive adhesive sheet having a thickness of about 50 μm.

Several pressure-sensitive adhesive sheets were bonded to S10 Lumirror #75 (manufactured by Toray Industries, Inc.)

to adjust the adhesive thickness, thereby producing a pressure-sensitive adhesive sheet having an adhesive thickness of 200 μm.

Examples 2 and 3

Pressure-sensitive adhesive compositions of Examples 2 and 3 were prepared and pressure-sensitive adhesive sheets were produced in the same manner as in Example 1 except that the amounts of 3-acrylamide benzeneboronic acid (AAPBA) and butyl acrylate (BA) used were changed as shown in Table 1.

Comparative Example 1

A pressure-sensitive adhesive composition of Comparative Example 1 was prepared and a pressure-sensitive adhesive sheet was produced in the same manner as in Example 1 except that 3-acrylamide benzeneboronic acid (AAPBA) was changed to acrylic acid (AA).

Comparative Example 2

(Preparation of Pressure-Sensitive Adhesive Sheet (C2))

A reaction vessel equipped with a stirrer, a thermometer, a nitrogen gas inlet tube, a reflux cooler, and a dropping funnel was charged with 100 parts by mass of n-butyl acrylate (BA), 8 parts by mass of vinyl acetate (VAc), 3 parts by mass of acrylic acid (AA), 0.1 parts by mass of 2-hydroxyethyl acrylate (HEA), 0.2 parts by mass of 2,2'-azobisisobutyronitrile (AIBN) as a polymerization initiator, and a mixed solvent obtained by mixing toluene and ethyl acetate as a polymerization solvent at a mass ratio of 5:5, nitrogen reflux was performed at room temperature for 1 hour, and then a solution polymerization reaction was carried out at about 58° C. for 6 hours. Next, an aging reaction was carried out at 65° C. for 2 hours and at 72° C. for 2 hours. Thereafter, the mixture was allowed to cool to obtain a solution of an acrylic polymer. The acrylic polymer had a Mw of about 60×10$^4$. The Mw/Mn was 5.0, and the proportion of the polymers having an Mw of 100,000 or less was about 20%.

To the solution of the acrylic polymer obtained above, 2 parts by mass of an isocyanate-based crosslinking agent (trade name "CORONATE L", manufactured by Nippon Polyurethane Industry Co., Ltd.) was added as a crosslinking agent relative to 100 parts by mass of the acrylic polymer, and a pressure-sensitive adhesive composition (C2) was prepared.

A sheet-shaped release liner in which a polyethylene layer having a thickness of 25 μm was laminated on one surface of woodfree paper and a release treatment with a silicone-based release agent was performed thereon was prepared. The pressure-sensitive adhesive composition (C2) was applied to a release surface of the release liner, and dried at 120° C. for 3 minutes to form two sheets in which a pressure-sensitive adhesive layer (C2) of 75 μm was formed. The two sheets were bonded to both surfaces of a support (mass: 14 g/m$^2$, pulp rayon paper manufactured by Daifuku Paper Mfg. Co., Ltd.), and a pressure-sensitive adhesive sheet (C2) was prepared.

Comparative Example 3

(Preparation of Pressure-Sensitive Adhesive Composition (C3))

With a monomer mixture composed of 90 parts by mass of 2-ethylhexyl acrylate (2EHA) and 10 parts by mass of AA, 0.05 parts by mass of 2,2-dimethoxy-1,2-diphenylethan-1-one (trade name "IRGACURE 651", manufactured by BASF SE) and 0.05 parts by mass of 1-hydroxycyclohexyl-phenyl-ketone (trade name "IRGACURE 184", manufactured by BASF SE) were blended as photopolymerization initiators, and then the thus-obtained product was irradiated with UV until the viscosity reaches about 15 Pa·s, thereby preparing a monomer syrup (partially polymerized product) in which a part of the above monomer mixture was polymerized.

(Production of Pressure-Sensitive Adhesive Sheet (C3))

With respect to 100 parts by mass of the monomer syrup, 0.08 parts by mass of 1,6-hexanediol diacrylate (HDDA) was added as a crosslinking agent, and a defoaming treatment was performed. After the defoaming treatment, 0.7 parts by mass of a fluorine-based surfactant was added to obtain a pressure-sensitive adhesive composition (C3).

Two PET films each having a thickness of 38 μm, one surface of which was a release surface treated with a silicone-based release treatment agent, were prepared.

To 100 parts of the above pressure-sensitive adhesive composition (C3), 0.03 parts by mass of "IRGACURE 651" was added, and the mixture was applied to the release surface of the first PET film. The coated release surface is covered with a release surface of the second PET film, and both surfaces were irradiated with UV having an illuminance of 5 mW/cm$^2$ for 3 minutes to perform curing. For UV radiation, "Black Light" (trade name) manufactured by Toshiba Corporation was used. The UV was measured using an industrial UV checker having a peak sensitivity wavelength of about 350 nm (trade name "UVR-T1", manufactured by Topcon Corporation, light receiving unit model UD-T36). In this manner, the pressure-sensitive adhesive layer (C3) having a thickness of 400 μm was formed to prepare a pressure-sensitive adhesive sheet (C3).

TABLE 1

| | | Example 1 | Example 2 | Example 3 | Comparative Example 1 | Comparative Example 2 | Comparative Example 3 |
|---|---|---|---|---|---|---|---|
| Base polymer | Butyl acrylate (BA) | 95 | 97 | 99 | 95 | Pressure-sensitive adhesive layer C2 | Pressure-sensitive adhesive layer C3 |
| | Acrylic acid (AA) | 0 | 0 | 0 | 5 | | |
| | 3-acrylamide benzeneboronic acid (AAPBA) | 5 | 3 | 1 | 0 | | |
| Distance between O-O Å | | 2.26 | 2.26 | 2.26 | — | — | — |
| Adhesion to glass in water N/20 mm | | 14.6 | 9.8 | 2.62 | 0.1 | 1.65 | 2.01 |

INDUSTRIAL APPLICABILITY

According to the present invention, it is possible to provide a pressure-sensitive adhesive composition exhibiting a high adhesive force to an adherend in water or in a wet state, a pressure-sensitive adhesive layer formed of the pressure-sensitive adhesive composition, and a pressure-sensitive adhesive sheet including the pressure-sensitive adhesive layer.

Although the present invention has been described in detail with reference to specific embodiments, it will be apparent to those skilled in the art that various modifications and variations are possible without departing from the spirit and scope of the present invention.

REFERENCE SIGNS LIST

10, 30, 40 Pressure-sensitive adhesive sheet
11, 31 Substrate
12, 42 Pressure-sensitive adhesive layer
32A First pressure-sensitive adhesive layer
32B Second pressure-sensitive adhesive layer
13 Release liner
33A, 43A First release liner
33B, 43B Second release liner

The invention claimed is:

1. A pressure-sensitive adhesive composition, comprising a compound having a substituent represented by the following general formula (1), wherein,
the compound is a polymer containing a structure derived from a (meth) acrylate monomer whose homopolymer has a glass transition temperature of 10° C. or lower, and
when each of $R^1$ and $R^2$ in the substituent represented by the general formula (1) represents a hydrogen atom, a distance between an oxygen atom of —$OR^1$ and an oxygen atom of —$OR^2$ is 1.31 Å or more and 4.70 Å or less

[Chem. 1]

(1)

(in the general formula (1), L represents a phosphorus atom, or a boron atom; and each of $R^1$ and $R^2$ independently represents a hydrogen atom, or an aliphatic hydrocarbon group, an aryl group or a heterocyclic group which may have a substituent).

2. A pressure-sensitive adhesive layer formed of the pressure-sensitive adhesive composition according to claim 1.

3. A pressure-sensitive adhesive sheet comprising the pressure-sensitive adhesive layer according to claim 2.

4. The pressure-sensitive adhesive sheet according to claim 3, wherein the pressure-sensitive adhesive layer is formed on a substrate.

* * * * *